United States Patent
Salerno et al.

(10) Patent No.: US 12,344,196 B2
(45) Date of Patent: Jul. 1, 2025

(54) GEAR TRENCH FOR STORING EQUIPMENT AND GEAR IN A VEHICLE

(71) Applicant: Rivian IP Holdings, LLC, Irvine, CA (US)

(72) Inventors: Jonathan David Salerno, Newport, CA (US); Luke James Mack, Newport Beach, CA (US); Roman Mistiuk, Westland, MI (US); Soyoung Park, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 283 days.

(21) Appl. No.: 17/832,288

(22) Filed: Jun. 3, 2022

(65) Prior Publication Data

US 2023/0391265 A1   Dec. 7, 2023

(51) Int. Cl.
*B60R 5/00* (2006.01)
*B62D 25/20* (2006.01)

(52) U.S. Cl.
CPC .............. *B60R 5/00* (2013.01); *B62D 25/20* (2013.01)

(58) Field of Classification Search
CPC .... B60R 5/00; B60R 5/02; B60R 5/04; B60R 5/006; B60R 2011/0003;

(Continued)

(56) References Cited

U.S. PATENT DOCUMENTS

| 4,738,480 A | * | 4/1988 | Ward | ................... B60R 21/026 |
| | | | | 296/37.6 |
| 4,941,702 A | * | 7/1990 | Southward | ........... B62D 47/003 |
| | | | | 296/190.08 |

(Continued)

FOREIGN PATENT DOCUMENTS

| DE | 4438909 C1 | 3/1996 |
| DE | 29615812 U1 | 11/1996 |

(Continued)

OTHER PUBLICATIONS

Frank Markus, "2021 Bollinger B1/B2 Electric Truck and SUV First Look Review", available online at <https://www.motortrend.com/reviews/2021-bollinger-b1-b2-electric-truck-suv-first-look-review/>, Sep. 26, 2019, 5 pages.

*Primary Examiner* — Amy R Weisberg
*Assistant Examiner* — Veronica M Shull
(74) *Attorney, Agent, or Firm* — Haley Guiliano LLP

(57) ABSTRACT

A vehicle includes a storage trench having a bottom surface and side surfaces. The bottom surface is recessed relative to a floor of the vehicle, a first side surface extends upwards from the bottom surface to the floor on a first side of the trench, and a second side surface extends upwards from the bottom surface to the floor on a second side of the trench. The trench extends between a first seat and a second seat of the vehicle, unobstructed from an occupant compartment to a storage compartment. The trench allows access from outside of the vehicle, for example, from either a forward or rearward storage compartment. An inset may be included along the bottom surface. The insert can be removed, by sliding for example, for cleaning or to help access stored gear. The trench is longer than either storage compartment, capable of storing relatively long gear or equipment.

18 Claims, 7 Drawing Sheets

(58) Field of Classification Search
CPC ... B60R 2011/0029; B62D 25/20; A61G 3/08; A61G 3/085; A61G 3/0808
USPC .......... 296/193.07, 24.43, 24.46, 67.6, 37.6, 296/37.14, 37.16, 37.8, 19
See application file for complete search history.

(56) References Cited

U.S. PATENT DOCUMENTS

| | | | | |
|---|---|---|---|---|
| 5,137,413 | A * | 8/1992 | Ressler | B60P 1/43 280/43.11 |
| 5,498,048 | A * | 3/1996 | Shelby, Jr. | B60P 3/14 296/24.45 |
| 5,599,054 | A * | 2/1997 | Butz | B60R 5/006 296/37.14 |
| 5,895,086 | A * | 4/1999 | Carico | B60R 11/06 296/37.6 |
| 6,006,841 | A * | 12/1999 | Hunke | A62C 33/00 248/90 |
| 6,276,474 | B1 * | 8/2001 | Ruppert | B60K 7/0007 180/65.6 |
| 6,550,849 | B1 * | 4/2003 | Dosdall | B62D 33/06 296/146.12 |
| 7,086,689 | B2 * | 8/2006 | Dean | B62D 33/027 296/182.1 |
| 7,431,366 | B2 * | 10/2008 | Sankrithi | B62D 47/003 296/64 |
| 7,641,209 | B2 * | 1/2010 | Watters | B60G 11/16 296/25 |
| 8,052,206 | B2 * | 11/2011 | Wang | B62D 25/20 280/783 |
| 8,485,583 | B2 * | 7/2013 | Mather | B60N 2/3075 296/65.09 |
| 8,960,772 | B2 * | 2/2015 | Lane | B60K 7/0007 296/183.1 |
| 9,333,129 | B2 * | 5/2016 | Cardona | B60P 7/0823 |
| 10,676,137 | B2 * | 6/2020 | Bollinger | B62D 25/20 |
| 11,685,315 | B2 * | 6/2023 | Salter | B60R 7/04 296/37.8 |
| 2009/0294497 | A1 * | 12/2009 | Todorovic | B60R 9/02 224/555 |
| 2013/0270854 | A1 * | 10/2013 | Weller | B62D 33/042 296/37.6 |
| 2020/0369212 | A1 * | 11/2020 | Zeuner | B60R 5/041 |

FOREIGN PATENT DOCUMENTS

| | | |
|---|---|---|
| DE | 202008009872 U1 | 10/2008 |
| DE | 202016001221 U1 | 4/2016 |

* cited by examiner

GEAR TRENCH FOR STORING EQUIPMENT AND GEAR IN A VEHICLE

INTRODUCTION

In some embodiments, the present disclosure is directed to a gear trench for storing equipment and gear in a vehicle. For example, a vehicle may include a recessed, durable trench running the length of the interior (access through front and back) that can withstand dirt, water, snow, or debris.

SUMMARY

In some embodiments, the present disclosure is directed to a gear or storage trench for storing equipment and gear. In some embodiments, a storage trench of a vehicle is recessed in a vehicle floor and includes a bottom surface and sides. The bottom surface is recessed relative to a floor of an occupant compartment of the vehicle (e.g., arranged below the floor, which may include rubber, plastic, or carpet to collect dirt and liquids or otherwise act as a basin). A first side surface extends upwards from the bottom surface to the floor on a first side of the trench, and a second side surface extends upwards from the bottom surface to the floor on a second side of the trench. In some embodiments, the trench extends between a first seat and a second seat of the vehicle. In some embodiments, the trench extends unobstructed from an occupant compartment of the vehicle to a storage compartment of the vehicle allowing access from outside of the vehicle. In some embodiments, the trench includes a length that is greater than a first length of the storage compartment, which may include a front compartment or a rear compartment. In some embodiments, an insert is included and configured to be arranged along the trench. For example, a bottom portion of the insert is recessed below the floor of the occupant compartment when installed. In some embodiments, the insert is configured to be removable from the trench by accessing the insert from the storage compartment. In some embodiments, the storage trench includes one or more rails, and the insert is configured to translate along the one or more rails. In some embodiments, the storage trench includes one or more features, and the insert includes one or more mating features that form a sliding interface with the one or more features.

In some embodiments, the present disclosure is directed to a vehicle having an occupant compartment, another compartment, and a trench. The occupant compartment includes a first seat and a second seat arranged in a first row, and a floor arranged at a bottom side of the occupant compartment. The other compartment is arranged longitudinally offset from the occupant compartment, for example, forward of or rearward of the occupant compartment. The trench extends from the other compartment to the occupant compartment between the first seat and the second seat. The trench includes an upward facing surface providing an interface to the occupant compartment, wherein the upward facing surface is recessed in the floor of the occupant compartment. In some embodiments, the floor includes a first material, and the trench includes a second material different from the floor material. For example, the second material is waterproof.

In some embodiments, the occupant compartment includes a dash console arranged at a front side of the occupant compartment, a first floor section of the floor arranged beneath the first seat, and a second floor section of the floor arranged beneath the first seat. In some such embodiments, the trench extends between the first flow section and the second floor section beneath the dash console.

In some embodiments, the other compartment is a hood compartment arranged in front of the occupant compartment. In some such embodiments, the vehicle includes a hood configured to provide access to the trench. In some embodiments, the occupant compartment includes a second row of seats arranged behind the first row, and the trench extends from the hood compartment past the first row of seats to the second row of seats. In some embodiments, the hood compartment has a first length, the occupant compartment includes a second length, and the trench extends the first length plus the second length. In some embodiments, the vehicle includes a rear compartment arranged behind the occupant compartment, and the trench extends from the hood compartment to the rear compartment through the occupant compartment. For example, in some embodiments, the other compartment is a rear compartment arranged behind the occupant compartment.

In some embodiments, the occupant compartment includes a second row of seats arranged in front of the first row of seats, and the trench extends from the rear compartment past the first row of seats to the second row of seats. In some embodiments, the rear compartment has a first length, the occupant compartment has a second length, and the trench extends the first length plus the second length.

In some embodiments, the trench includes a concave lateral cross-section shape. In some embodiments, the trench includes a bottom surface recessed relative to the floor, a first side surface extending upwards from the bottom surface to the floor on a first side of the trench, and a second side surface extending upwards from the bottom surface to the floor on a second side of the trench. In some embodiments, the vehicle includes an insert configured to be arranged along the trench, wherein a bottom portion of the insert is recessed below the floor of the occupant compartment when installed. In some embodiments, the insert is configured to be removable from the trench by accessing the insert from the compartment other than the occupant compartment (e.g., a hood compartment, a trunk compartment).

In some embodiments, the other compartment (i.e., other than the occupant compartment) of the vehicle is accessible from an exterior of the vehicle separate from the occupant compartment, and the vehicle further includes a panel configured to provide the accessibility to the trench and to restrict accessibility to the trench. The panel may include a hood, trunk, frunk (e.g., a front trunk), tailgate, bed cover, front or rear bumper panel, another suitable body panel or exterior panel, or any combination thereof. In some embodiments, the occupant compartment includes a second row of seats arranged longitudinally offset from the first row (e.g., a front row and a rear row), and the trench extends from the other compartment past the first row of seats to the second row of seats. In some embodiments, the other compartment includes a first length, the occupant compartment includes a second length, and the trench extends the first length plus the second length (e.g., optionally past one or more row of seats). In some embodiments, the other compartment includes a rear compartment arranged behind the occupant compartment, and the panel includes a rear panel.

In some embodiments, the vehicle includes a cover arranged to cover the trench, and the cover is joined to a side surface of the trench at a hinge. In some embodiments, the vehicle includes a tie-down arranged to at least partially cover the trench and configured to secure items in the trench, and the tie down is joined to a side surface of the trench at a mount. For example, the vehicle may include one or more covers, one or more tiedowns, or a combination thereof.

In some embodiments, the present disclosure is directed to a vehicle having a first row of seats, a floor, at least one compartment, and a trench. The floor is arranged below the first row of seats and, in some embodiments, below a dash console. The at least one compartment is arranged longitudinally offset from the occupant compartment. For example, each compartment is forward or rearward of the occupant compartment. The trench extends from an end of the vehicle to below the first row of seats and includes an upward facing surface recessed in the floor of the occupant compartment. In some embodiments, the vehicle may include a dash console arranged in front of the first row of seats. In some embodiments, the at least one compartment includes a forward storage compartment arranged at a front of the vehicle, and a rearward storage compartment arranged at a rear of the vehicle. The trench includes a length that is greater than a first length of the forward storage compartment and greater than a second length of the rearward storage compartment.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to a trench for storing equipment in a vehicle. For example, in some circumstances, a vehicle occupant may want to store relatively long items while avoiding the risk of damaging or dirtying the vehicle interior. In a further example, the occupant may want to access gear or equipment stored in a storage compartment of the vehicle, and the trench may provide such access from the occupant compartment. As used herein, the terms trench, storage trench, and gear trench are interchangeable, and describe a space configured and arranged for storing items in a vehicle.

Figure 1:
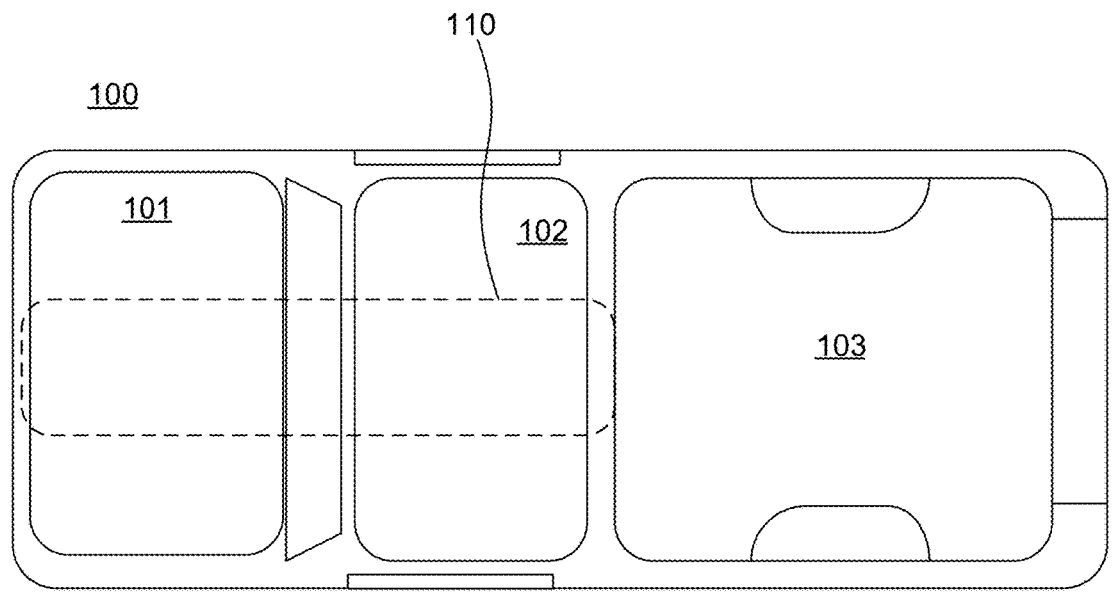
FIG. 1 shows a top view of an illustrative vehicle having a storage trench, in accordance with some embodiments of the present disclosure.

FIG. 1 shows a top view of illustrative vehicle 100 having storage trench 110, in accordance with some embodiments of the present disclosure. As illustrated, vehicle 100 includes occupant compartment 102, storage compartment 101, cargo bed 103, and storage trench 110. For example, trench 110 may be a recessed, durable trench running the length of the interior (e.g., storage compartment 101, occupant compartment 102, or both, with access through front and back) that can store items that may collect dirt, water, snow, or debris. Accordingly, an occupant in occupant compartment 102 can access gear from trench 110 that may extend into storage compartment 101 (e.g., items such as skis, fishing poles, lumber, or other relatively long items). For example, trench 110 may increase the length of objects able to be stored inside an interior of the vehicle, improve accessibility to outside of vehicle, allow relatively easy sliding of objects without damage to interior, or a combination thereof In an illustrative example, vehicle 100 may be an electric vehicle with the front storage area (e.g., referred to as a front trunk area or "frunk").

Figure 2:
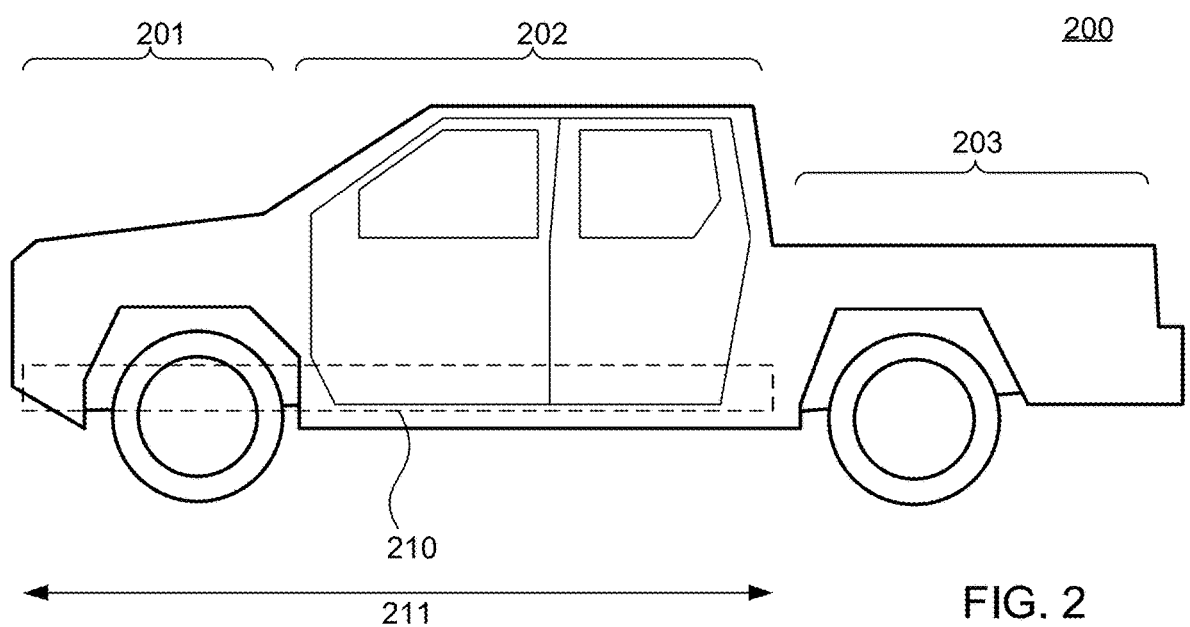
FIG. 2 shows a side view of an illustrative vehicle having a storage trench, in accordance with some embodiments of the present disclosure.

FIG. 2 shows a side view of illustrative vehicle 200 having storage trench 210, in accordance with some embodiments of the present disclosure. Vehicle 200 may be the same as or similar to vehicle 100 of FIG. 1 (e.g., storage trench 210 may be similar to trench 110 of FIG. 1). As illustrated, vehicle 200 includes occupant compartment 202, storage compartment 201, cargo bed 203, and storage trench 210. As illustrated, storage trench 210 has length 211 greater than a length of any of occupant compartment 202, storage compartment 201, or cargo bed 203. For example, as illustrated, length 211 is about equivalent to the sum of the lengths of occupant compartment 202 and storage compartment 201. Because trench 210 is arranged lower than the rest of the interior (e.g., recessed in the floor of occupant compartment 202), trench 210 can act as a natural place for debris to collect and be easily cleaned away (e.g., a basin).

Figure 3:
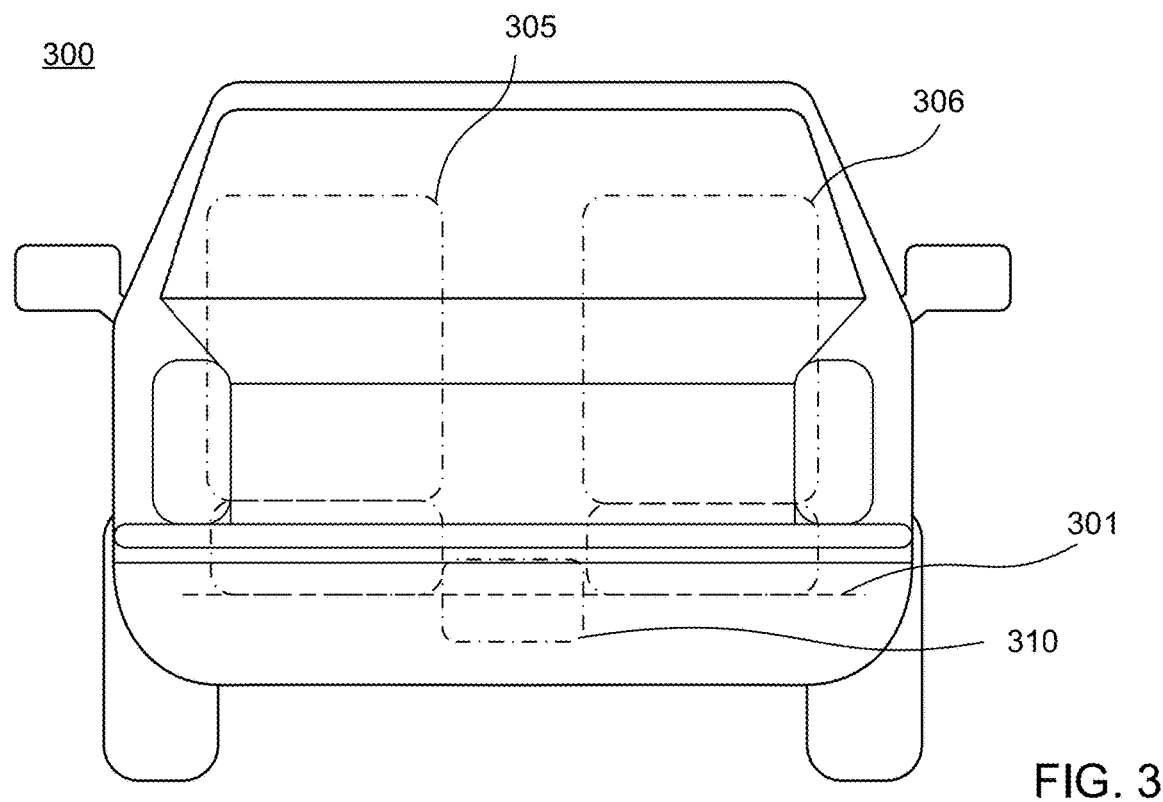
FIG. 3 shows a front view of an illustrative vehicle having a storage trench, in accordance with some embodiments of the present disclosure.
Figure 4:
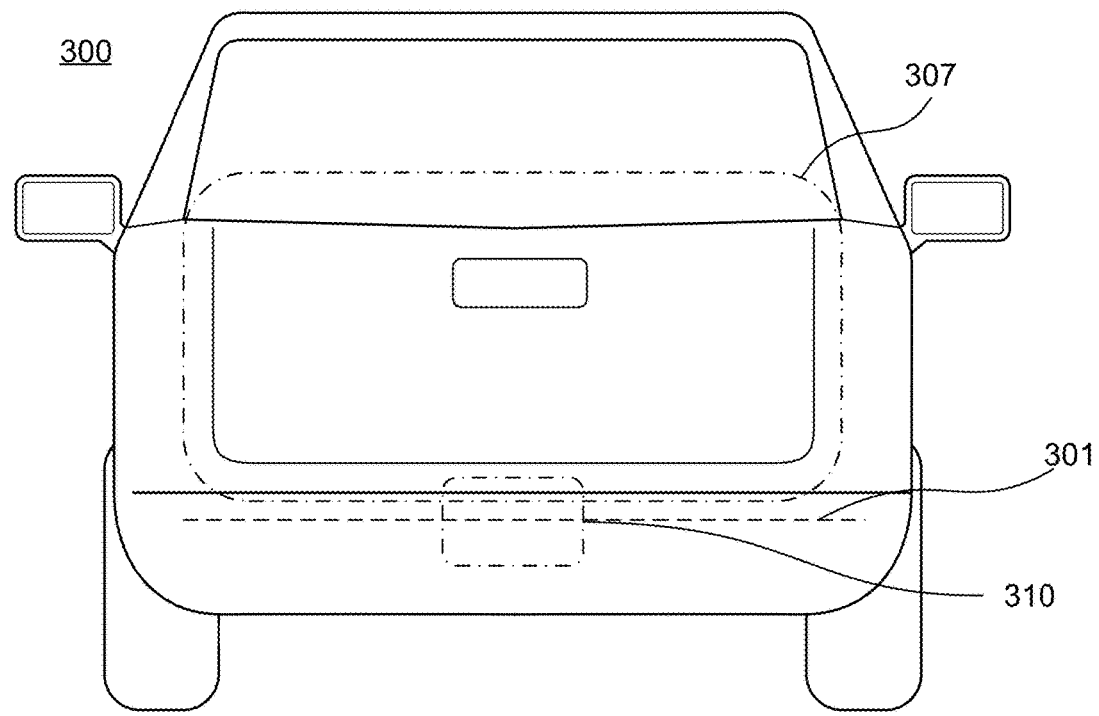
FIG. 4 shows a rear view of the vehicle of FIG. 3, in accordance with some embodiments of the present disclosure.

FIG. 3 shows a front view of illustrative vehicle 300 having storage trench 310, in accordance with some embodiments of the present disclosure. FIG. 4 shows a rear view of vehicle 300 of FIG. 3, in accordance with some embodiments of the present disclosure. Vehicle 300 includes first seat 305, second seat 306, which are arranged as a first row of seats (e.g., a front row of seats), and seats 307, which may be rear seats (e.g., a rear bench seat). Trench 310 is arranged in vehicle 300, and extends from the front of vehicle 300 to the rear of vehicle 300, through the occupant compartment. As illustrated, trench 310 can be recessed in floor 301 of vehicle 300, and may include side and top surfaces that extend above floor 301 (e.g., when passing beneath seats 305-307, through bulkheads, when covered (e.g., by a cover), or a combination thereof. Accordingly, trench 310 need not have a constant height from front to back (e.g., trench 310 may include varying vertical clearance along the longitudinal axis of vehicle 300). In some embodiments, trench 310 may slope, curve, or otherwise change elevation along the longitudinal axis (i.e., front to back) of vehicle 300 to clear other components, provide a low region to act as a basin (e.g., for liquids), provide more vertical clearance, or a combination thereof. In some embodiments, trench 310 extends unobstructed from an occupant compartment of vehicle 300 to a storage compartments of vehicle 300.

The illustrative trenches illustrated in FIGS. 1-4 may include tie-downs, bungee cords, nets, or straps to keep items from moving. In some embodiments, the trenches of FIGS. 1-4 allow relatively longer objects to be stored inside an interior of the vehicle, while allowing accessibility to the items from outside of the vehicle. For example, the trenches of FIGS. 1-4 allow for ease in sliding items in and out without damage to the interior of the vehicle (e.g., of the storage compartment or the occupant compartment). The trenches of the present disclosure allow for storage of, for example, a full ski, snowboards, lumber, or other long items that can pass through the interior unobstructed or without worry of damaging the vehicle interior.

Figure 5:
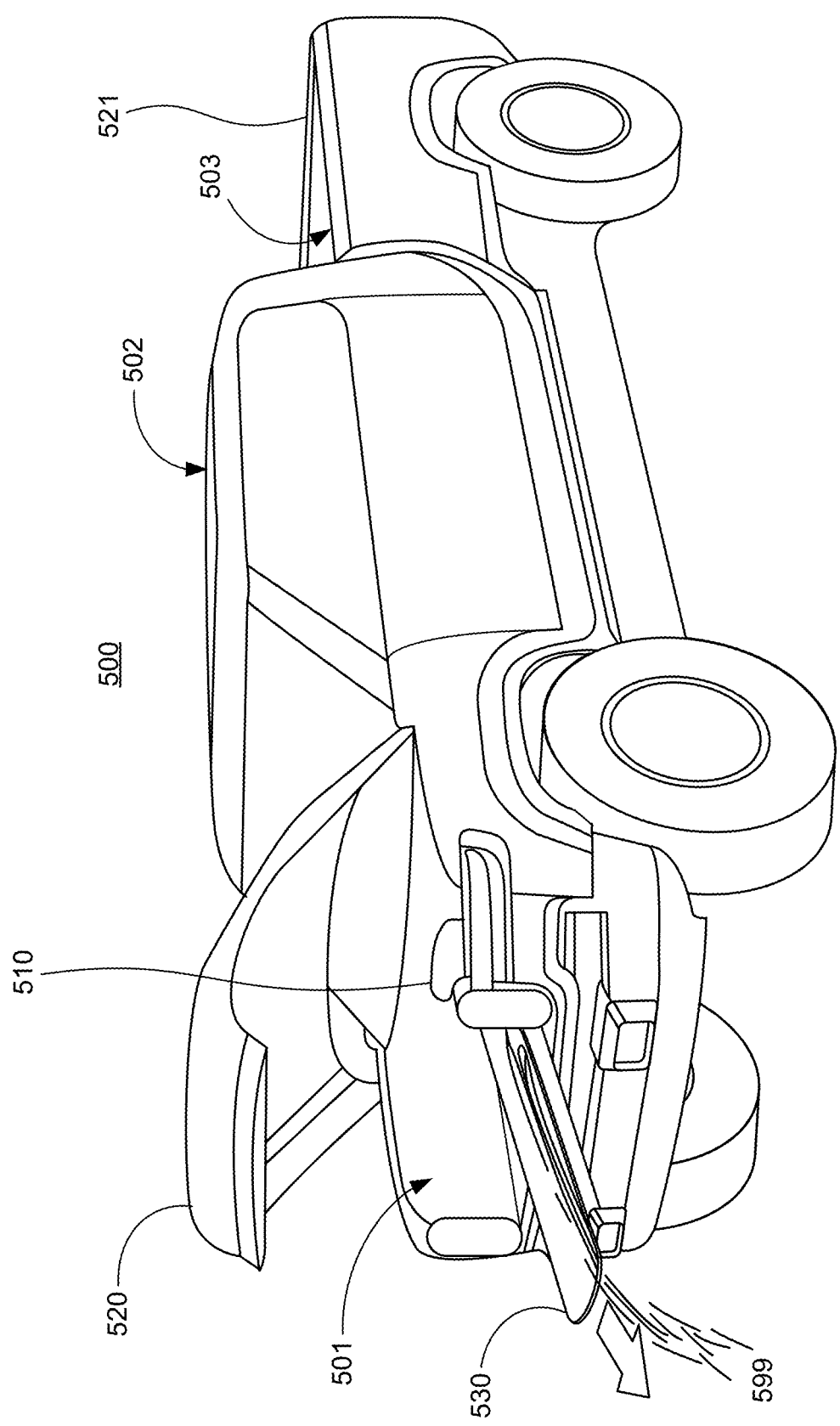
FIG. 5 shows a perspective view of an illustrative vehicle having a storage trench with an insert, in accordance with some embodiments of the present disclosure.

FIG. 5 shows a perspective view of illustrative vehicle 500 having storage trench 510 with insert 530, in accordance with some embodiments of the present disclosure. Vehicle 500 includes storage compartment 501 (e.g., a hood compartment, front compartment, or frunk), storage compartment 503 (e.g., a truck bed), occupant compartment 502, hood 520, trench 510 (e.g., extending from storage compartment 501 to storage compartment 503 via occupant compartment 502), and insert 530 (e.g., illustrated in a removed state). As illustrated, insert 530 is configured to be removable from storage trench 510 by accessing insert 530 from storage compartment 501, storage compartment 503, or both. Trench 510 may include open regions (e.g., in occupant compartment 502, or storage compartments 501 and 503), pass-throughs (e.g., through a firewall, a wall of a cargo bed, or other bulkhead), covers, or a combination thereof.

In an illustrative example, insert 530 may be configured to be arranged along storage trench 510. In some embodiments, a bottom portion of insert 530 is recessed below the floor of occupant compartment 502 when installed. A vehicle user may want to store a relatively long item, which may be longer than each of storage compartment 501, storage compartment 503, and occupant compartment 502. The user may access trench 510 from either or both of storage compartments 501 and 503 to stow the item, by inserting the item into trench 510 (e.g., sliding the item along insert 530), or pulling insert 530 out from a stowed configuration (e.g., as illustrated, wherein the item can be placed on top of insert 530 and then insert 530 can be re-stowed). To illustrate, the user may lift hood 520 (e.g., as illustrated) to open storage compartment 501, and then either remove insert 530 to slide the item into trench 510 without removing insert 530. To illustrate further, the user may lift hood 520 (e.g., as illustrated) to open storage compartment 501, and then either remove insert 530 to slide the item into trench 510 without removing insert 530. In some embodiments, insert 530 is configured for arrangement in trench 510 and may be removed (e.g., items may be stored directly in trench 510 on a bottom surface of trench 510). For example, removal of insert 530 may provide more storage space in trench 510. In some circumstances, dirt, liquid (e.g., water or spilled liquids), or debris may collect in trench 510, or on insert 530 inserted therein, because the bottom surface of trench 510 and/or insert 530 are arranged below a floor of occupant compartment 502. In some such circumstances, the user may rinse, clean, wash, or otherwise discard of the collected material thus allowing easy cleaning of the trench storage region (e.g., trench 510 and/or insert 530).

Figure 6:
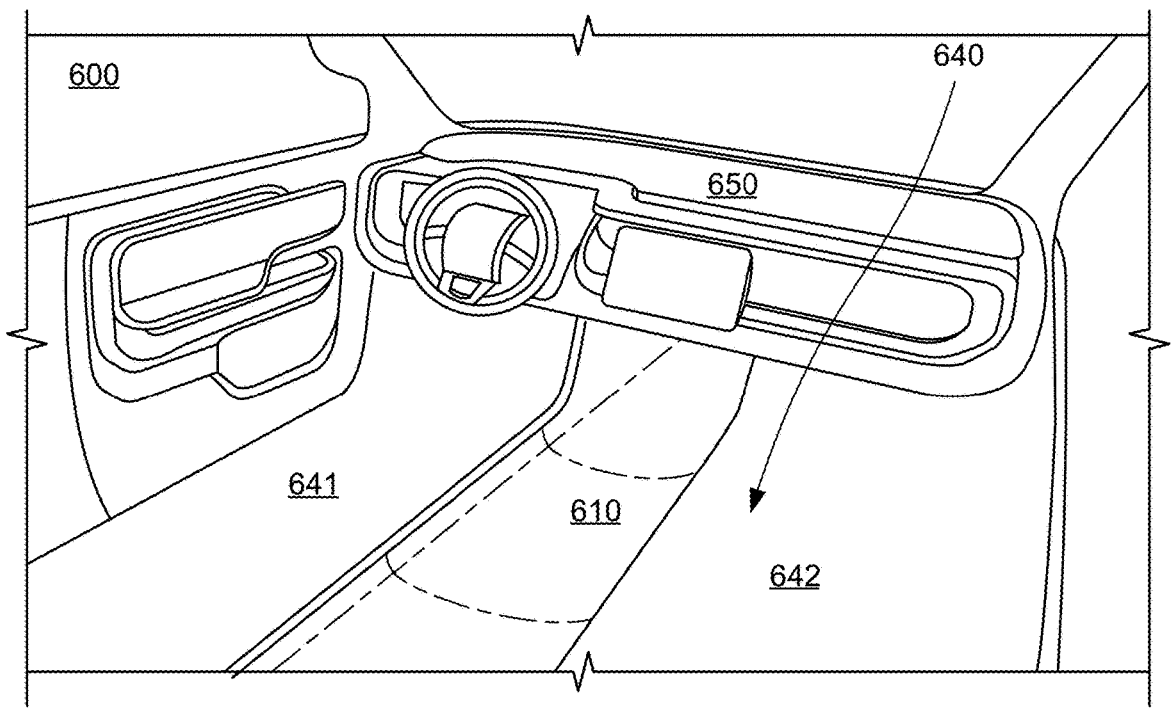
FIG. 6 shows a perspective view of an illustrative vehicle interior having an illustrative storage trench, in accordance with some embodiments of the present disclosure.

FIG. 6 shows a perspective view of an illustrative vehicle interior 600 (e.g., of an occupant compartment thereof) having an illustrative storage trench, in accordance with some embodiments of the present disclosure. As illustrated, trench 610 extends through the firewall of the vehicle (e.g., a front bulkhead), below dash console 650 (e.g., in some embodiments, a trench extends through a dash console), along floor 640 of vehicle interior 600 (e.g., the vehicle seats are not illustrated). Floor sections 641 and 642 of floor 640 are arranged on either side of trench 610, with trench 610 being recessed into the floor. To illustrate, in some embodiments, floor 640 of the vehicle may be carpeted while trench 610 may be rubberized, plastic, or otherwise impermeable, or more impermeable, to water. Although not shown completely in FIG. 6, trench 610 may extend into a front storage compartment, through the occupant compartment (e.g., a front bulkhead or firewall of vehicle interior 600), and extend rearward to a rear storage compartment (e.g., a truck bed, trunk, hatch area behind a row of seats, or a van storage area). To illustrate, items stored in or along trench 610 may be accessed from vehicle interior 600 or from one or both ends of the vehicle, depending on which storage compartments trench 610 extends into.

Figure 7:
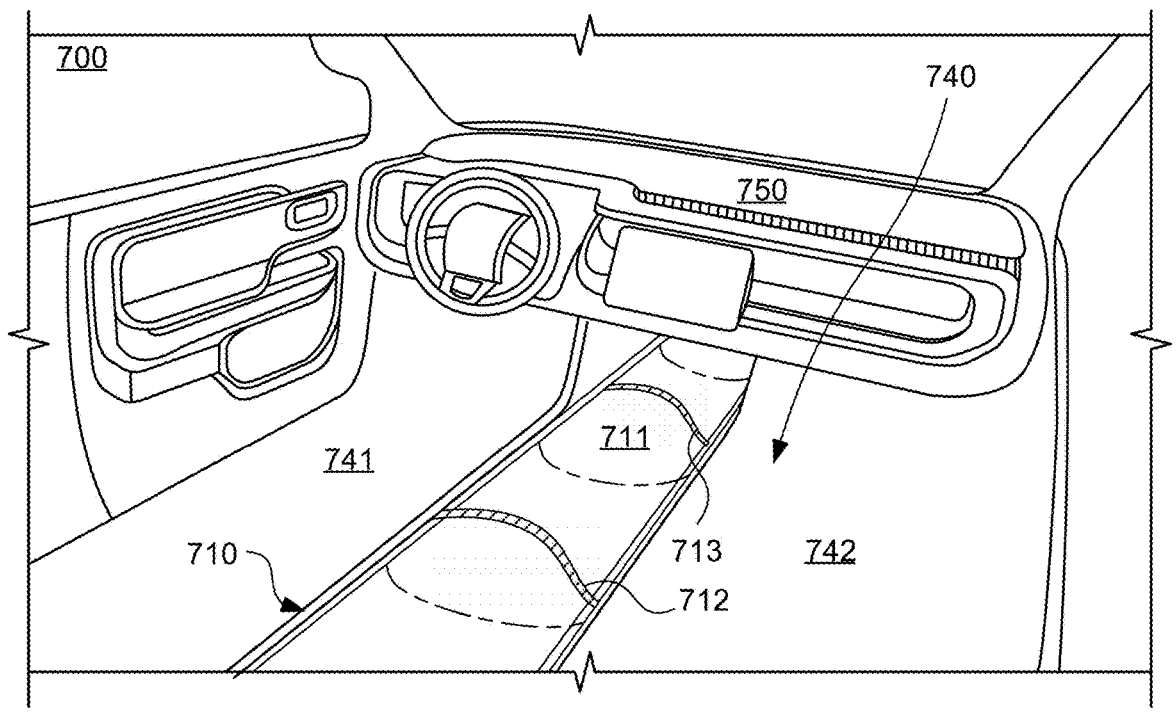
FIG. 7 shows a perspective view of an illustrative vehicle interior having an illustrative storage trench recessed from a floor, in accordance with some embodiments of the present disclosure.

FIG. 7 shows a perspective view of illustrative vehicle interior 700 having an illustrative storage trench recessed from a floor, in accordance with some embodiments of the present disclosure. As illustrated, trench 710 extends through the firewall of the vehicle (e.g., a front bulkhead), below dash console 750, along floor 740 of vehicle interior 700 (e.g., the vehicle seats are not illustrated). Insert 711 is arranged along trench 710, and includes straps 712 and 713 for securing items stored in trench 710. Floor sections 741 and 742 of floor 740 are arranged on either side of trench 710 and insert 711, with trench 710 and insert 711 being recessed into floor 740. To illustrate, in some embodiments, floor 740 of the vehicle may be carpeted while trench 710 may be rubberized, plastic, or otherwise impermeable, or more impermeable, to water (e.g., may be waterproof). Although not shown completely in FIG. 7, trench 710 may extend into a front storage compartment, through the occupant compartment (e.g., a front bulkhead or firewall of vehicle interior 700), and extend rearward to a rear storage compartment (e.g., a truck bed, hatch area behind a row of seats, or a van storage area). To illustrate, items stored in or along trench 710 and insert 711 may be accessed from vehicle interior 700 or from one or both ends of the vehicle, depending on which storage compartments trench 710 (e.g., and insert 711) extends into.

Figure 8:
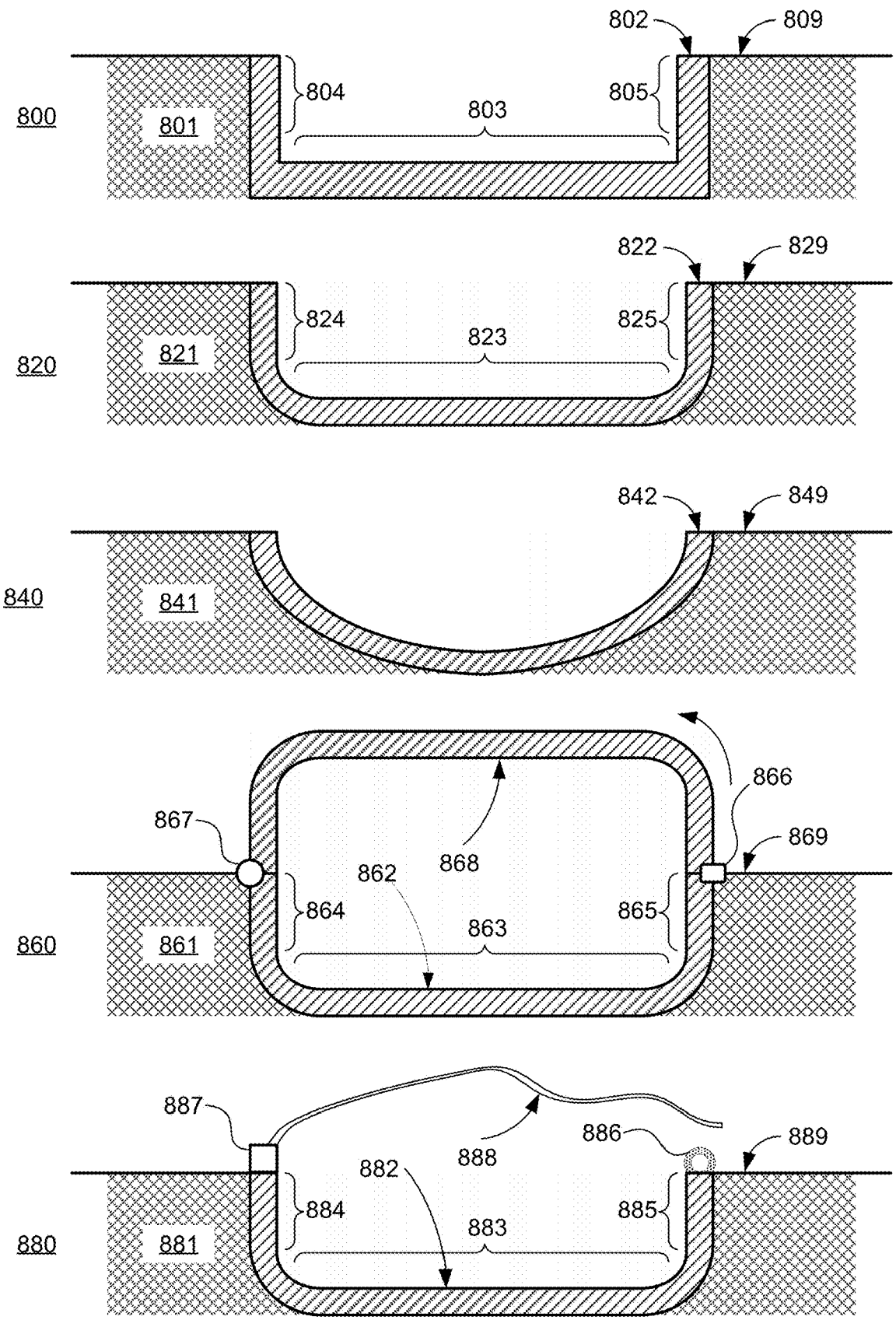
FIG. 8 shows cross-sectional longitudinal views of several illustrative trenches, in accordance with some embodiments of the present disclosure.

FIG. 8 shows cross-sectional longitudinal views of several illustrative trenches, in accordance with some embodiments of the present disclosure.

Illustrated in panel 800 is trench 802 arranged in floor 809, beneath floor section 801. Trench 802 includes bottom surface 803 and side surfaces 804 and 805 (e.g., first and second side surfaces). As illustrated, trench 802 forms a rectangular recess with relatively sharp corners (e.g., relatively lesser radius of curvature where bottom surface 803 meets side surfaces 804 and 805). In some embodiments, floor 809 includes a first material (e.g., carpet, matting, or plastic), and trench 802 includes a second material different from the floor material. For example, the second material is waterproof or water resistant (e.g., plastic, or rubber).

Illustrated in panel 820 is trench 822 arranged in floor 829, beneath floor section 821. Trench 822 includes bottom surface 823 and side surfaces 824 and 825 (e.g., first and second side surfaces). As illustrated, trench 822 forms a rounded rectangular recess with smoothed or otherwise contoured corners (e.g., relatively greater radius of curvature where bottom surface 803 meets side surfaces 804 and 805 as compared to trench 802 of panel 800).

Illustrated in panel 840 is trench 842 arranged in floor 849, beneath floor section 841. Trench 842 includes a contoured surface that does not exhibit clear bottom and side sections, but which forms a concave storage trench in floor 849. As illustrated, trench 842 forms a curved recess with relatively greater minimum-radius of curvature than either trench 802 of panel 800 or trench 822 of panel 820). Accordingly, a trench may include sides (e.g., flat or curved sections of the cross section) and a bottom that are not uniquely distinguishable and accordingly the surfaces correspond to the "bottom" and "sides" may be defined flexibly. To illustrate, the bottom surface may include the lowest region of trench 842 while the side surfaces may include the highest regions of trench 842, with the boundary between bottom and sides being arbitrarily drawn or drawn based on a suitable criteria (e.g., a particular slope or distance may define the boundary).

Illustrated in panel 860 is trench 862 arranged in floor 869, beneath floor section 861. Trench 862 includes bottom surface 863 and side surfaces 864 and 865 (e.g., first and second side surfaces), with cover 868 arranged to cover trench 862 (e.g., to provide an upper surface that interfaces to a storage compartment, occupant compartment, or both). As illustrated, cover 868 is joined to side surface 864 at hinge 867, and latches to side surface 865 at latch 866. As illustrated, cover 868 may be rotated about hinge 867 (e.g., after unlatching latch 869, which may include a magnetic latch or mechanical latch) to provide access to trench 862 from above. Accordingly, in some embodiments, a trench may include a removable cover, a movable cover, a collapsible cover, a flexible cover, multiple cover sections, or a combination thereof. Cover 866 may extend the entire length of trench 862, or any suitable portion thereof (e.g., in only some compartments, bulkhead regions, or a combination thereof). As illustrated, cover 868 is arranged above floor section 861, but in some configurations may be arranged to sit below or at (e.g., flush with) a height of floor section 861. In some embodiments, the vehicle includes cover 868 arranged to cover trench 862 at least partially, and cover 868 is joined to a side surface of the trench at hinge 867 to allow cover 868 to secure or provide access to items in trench 862. For example, the vehicle may include one or more covers 868 that each cover a portion of trench 862 and each may independently be arranged to secure or provide access to at least a portion of trench 862 (e.g., items stored therein).

Illustrated in panel 880 is trench 882 arranged in floor 889, beneath floor section 881. Trench 882 includes bottom surface 883 and side surfaces 884 and 885 (e.g., first and second side surfaces), with tie-down 888 arranged to at least partially cover trench 882 (e.g., to secure or bundle items in trench 882). As illustrated, tie down 888 is joined to side surface 884 at mount 887, and can be affixed to the top of side surface 885 at feature 886 (e.g., a loop as illustrated). Tie-down 888 may include a strap, netting, a bungee cord, or other suitable securement, which may be affixed mount 887 to secure items in trench 882. Accordingly, in some embodiments, a trench may include a removable tie-down, a stretchable tie-down (e.g., an elastic strap), a loop or D ring for securing a tie-down, any other suitable components for securing items in trench 882, or any combination thereof. Tie-down 888 may be single tie-down or may include a plurality of tie-downs (e.g., more than one tie-down) that may be arranged along the length of trench 882, or any suitable portion thereof (e.g., in only some compartments, bulkhead regions, or a combination thereof). To illustrate, tie-downs (e.g., straps) may be included to keep long items from moving or shifting. In some embodiments, the vehicle includes one or more tie-downs (e.g., a single tiedown, a set of tiedowns, each similar to tiedown 888) arranged to at least partially cover trench 882 and configured to secure items in trench 882. The one or more tiedowns (e.g., each similar to tiedown 888) may be joined to a side surface of the trench at respective mounts similar to mount 887 (e.g., mounting locations with fastening hardware).

Figure 9:
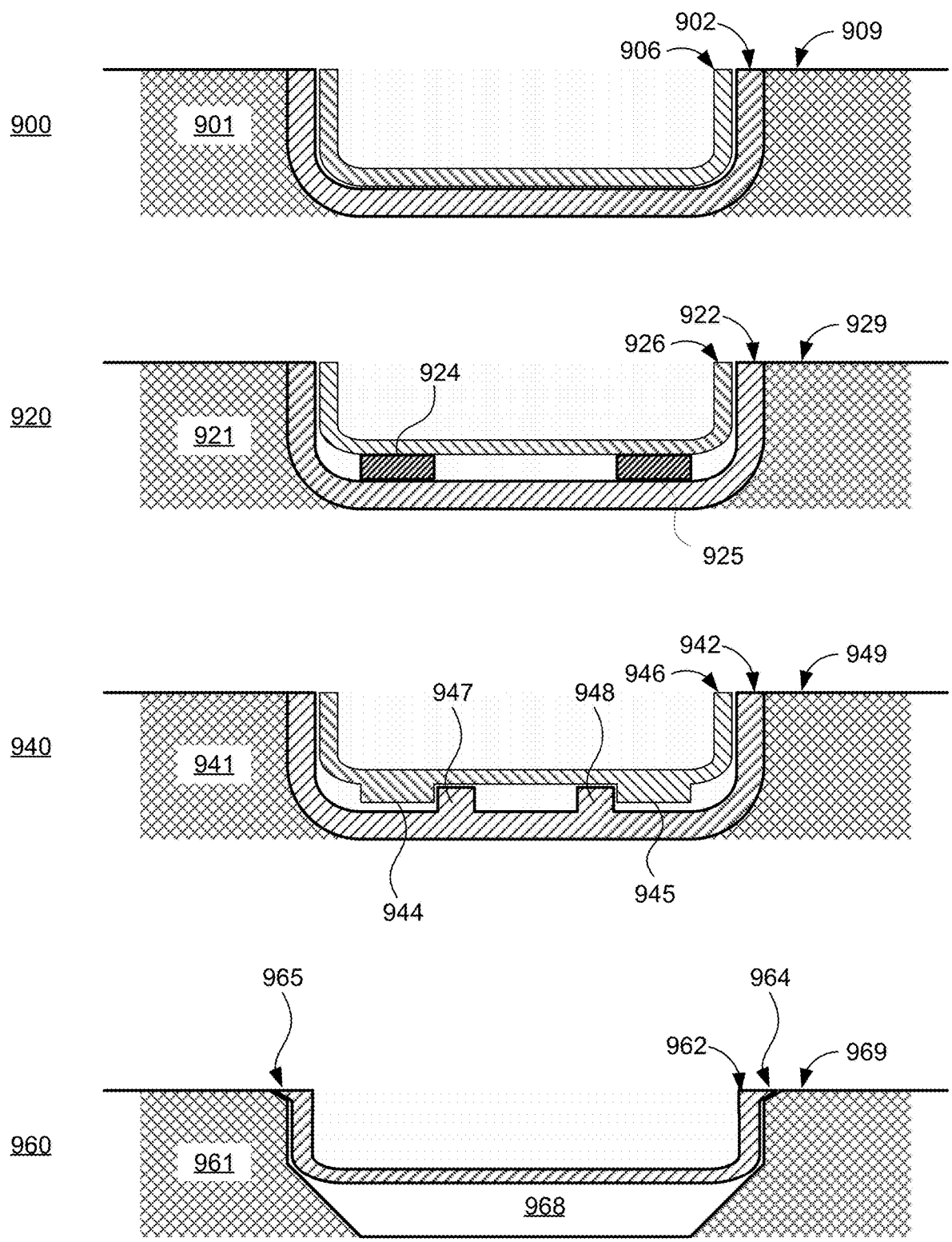
FIG. 9 shows cross-sectional longitudinal views of several illustrative trenches having inserts, in accordance with some embodiments of the present disclosure.

FIG. 9 shows cross-sectional longitudinal views of several illustrative trenches having inserts, in accordance with some embodiments of the present disclosure.

Illustrated in panel 900 is trench 902 arranged in floor 909, beneath floor section 901. Insert 906 is arranged on top of trench 902, and is configured to translate along trench 902 (e.g., slide along trench 902). As illustrated, trench 902 forms a recess having curved transitions from side surfaces to a bottom surface, similar to trench 822 of panel 820 of FIG. 8), and insert 906 exhibits a similar cross-sectional shape. Insert 906 may be removable, movable (e.g., slidable or liftable), or otherwise capable of being stowed, unstowed, or replaced. In some embodiments, insert 906 need not be removable or movable, and may be configured to be permanently installed.

Illustrated in panel 920 is trench 922 arranged in floor 929, beneath floor section 921. Insert 926 is arranged on top of trench 922, and is configured to translate along trench 922 (e.g., slide along trench 922) via rails 924 and 925. As illustrated, trench 922 forms a recess having curved transitions from side surfaces to a bottom surface, similar to trench 822 of panel 820 of FIG. 8), and insert 926 exhibits a similar cross-sectional shape. Insert 926 may be removable in addition to being movable via rails 924 and 925. In some embodiments, insert 926 need not be removable, and may be configured to be permanently coupled to rails 924 and 925. Rails 924 and 925 may include a sliding interface, a bearing interface (e.g., roller bearings), a rolling interface, a bushing interface (e.g., with an intermediate interface material having a relatively lesser coefficient of friction), a telescoping interface, any other suitable interface, or any combination thereof. In some embodiments, rails 924 and 925 include one or more mechanisms or systems such as, for example, a pully system, a rack and pinion system, a spring loaded system (e.g., to assist in re-stowing insert 926), a damper system (e.g., to prevent impact of insert 926 at the ends of travel), a detent system (e.g., to provide one or more equilibrium positions), a latch system (e.g., to hold insert 926 securely at a particular position), a locking system (e.g., to prevent displacement of inset 926), any other suitable mechanism or system, or any combination thereof. To illustrate, trench 922 may include one or more rails (e.g., rail 924, rail 925, or other suitable rails or combination thereof), and insert 926 is configured to translate along the one or more rails.

Illustrated in panel 940 is trench 942 arranged in floor 949, beneath floor section 941. Insert 946 is arranged on top of trench 942, and is configured to translate along trench 942 (e.g., slide along trench 942) via interfaces formed by features 944, 945, 947, and 948. As illustrated, trench 942 forms a recess having curved transitions from side surfaces to a bottom surface, similar to trench 822 of panel 820 of FIG. 8), and insert 946 exhibits a similar cross-sectional shape. Insert 946 includes features 944 and 945 (e.g., illustrated as boss features on the underside of insert 946) that engage with features 947 and 948 of trench 942 (e.g., illustrated as boss features laterally offset from features 944 and 945). The interface between features 944 and 947, and also between features 945 and 948, may include a sliding interface, a bearing interface (e.g., roller bearings), a rolling interface (e.g., including one or more rollers), a bushing interface (e.g., with an intermediate interface material having a relatively lesser coefficient of friction), any other suitable interface, or any combination thereof. In some embodiments, the interface between insert 946 and trench 942 includes one or more mechanisms or systems such as, for example, a pully system, a rack and pinion system, a spring loaded system (e.g., to assist in re-stowing insert 946), a damper system (e.g., to prevent impact of insert 946 at the ends of travel), a detent system (e.g., to provide one or more equilibrium positions), a latch system (e.g., to hold insert 946 securely at a particular position), a locking system (e.g., to prevent displacement of inset 946), any other suitable mechanism or system, or any combination thereof. Although illustrated as a set of boss features, either or both of an insert and a trench may include one or more recess features, one or more boss features, or a combination thereof. To illustrate, trench 942 may include one or more features (e.g., feature 947, feature 948, or any other suitable feature or combinations thereof), and insert 946 includes one or more mating features (e.g., feature 944, feature 945, any other suitable feature or combination thereof) that form a sliding interface with the one or more features of trench 942.

Illustrated in panel 960 is trench 962 arranged in floor 969, beneath floor section 961. As illustrated, trench 962 includes features 964 and 965 (e.g., illustrated as tapered lips) that rest on floor 969 to align trench 962, support trench 962, allow relative sliding between trench 962 and floor 969, or a combination thereof. As illustrated, floor 969 includes recess 968 (e.g., a cut-out, depression, hole, or otherwise opening extending below the level of floor 969), in which trench 962 is arranged. In some embodiments, recess 968 may accommodate trench 962 without a gap or space (e.g., trench 962 may interface closely to recess 968). In some embodiments, trench 962 need not interface against surfaces of recess 968, and a gap may exist between sections of trench 962 and recess 968 (e.g., as illustrated). As illustrated, trench 962 forms a recess having curved transitions from side surfaces to a bottom surface, generally similar to trench 822 of panel 820 of FIG. 8). Trench 962 includes features 964 and 965 (e.g., illustrated as boss features on the outboard edges of trench 962) that engage with floor 969 (e.g., which may include recesses, guides, or otherwise a mating interface to features 964 and 965). The interface between features 964 and 965 and floor 969 may include a sliding interface, a bearing interface (e.g., roller bearings), a rolling interface (e.g., including one or more rollers), a bushing interface (e.g., with an intermediate interface material having a relatively lesser coefficient of friction), any other suitable interface, or any combination thereof. In some embodiments, the interface between trench 962 and floor 969 includes one or more mechanisms or systems such as, for example, a pully system, a rack and pinion system, a spring loaded system (e.g., to assist in re-stowing trench 962), a damper system (e.g., to prevent impact of trench 962 at the ends of travel, if movable), a detent system (e.g., to provide one or more equilibrium positions), a latch system (e.g., to hold trench 962 securely at a particular position), a locking system (e.g., to prevent displacement of trench 962), any other suitable mechanism or system, or any combination thereof. Trench 962 need not be removable or movable, and may be, for example, permanently installed in floor 969. Further, although illustrated as a set of lips, either or both of a trench and a floor may include one or more recess features, one or more boss features, one or more step features, any other suitable features for interfacing, or a combination thereof.

It will be understood that any of the aspects illustrated in FIGS. 8-9 may be combined, omitted, or otherwise modified in accordance with the present disclosure. For example, a trench may be rectangular, rounded, or curved, and may include a strap or other tie-down, as well as a cover and/or insert.

Figure 10:
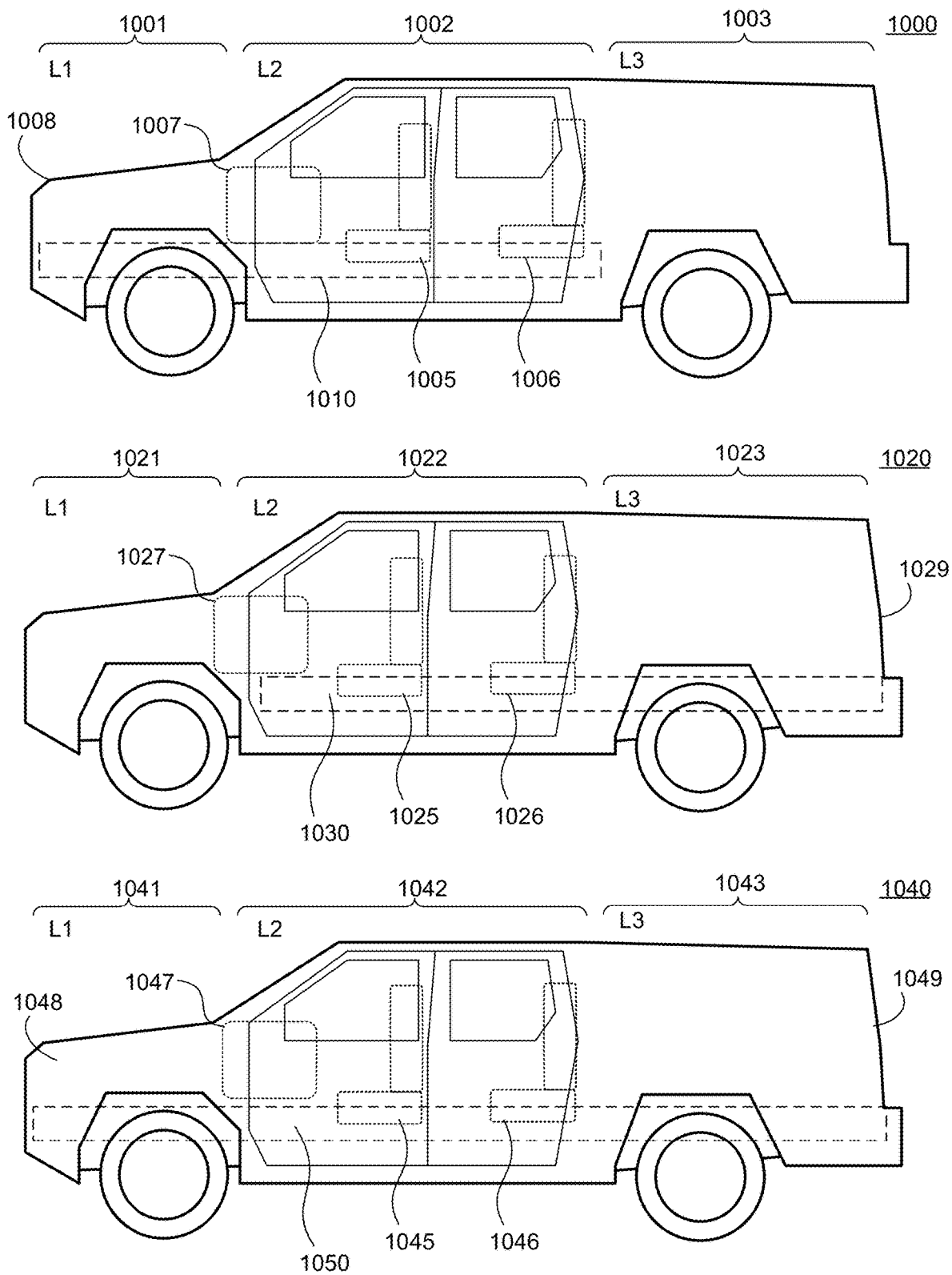
FIG. 10 shows side views of several illustrative vehicles, having various trench configurations, in accordance with some embodiments of the present disclosure.

FIG. 10 shows side views of several illustrative vehicles, having various trench configurations, in accordance with some embodiments of the present disclosure.

Vehicle 1000 includes trench 1010 extending from front compartment 1001 through occupant compartment 1002, but not to rear compartment 1003. For example, items may be loaded into trench 1010 from the front of vehicle 1000 by opening panel 1008 (e.g., a hood, bumper panel, or other suitable exterior panel or combination thereof) and passing the items through a bulkhead in the firewall of the vehicle. As illustrated, trench 1010 extends from front compartment 1001 beneath dash console 1007 (e.g., which may include a steering wheel, vent air grates and controls, a touchscreen, and user-controlled buttons or knobs), beneath a first row of seats 1005 (e.g., beneath and/or between front seats), and beneath a second row of seats 1006 (e.g., beneath and/or between rear seats). As illustrated, front compartment 1001 has a length L1 (e.g., corresponding to about the length indicated by the bracket), occupant compartment 1002 has a length L2 (e.g., corresponding to about the length indicated by the bracket), and rear compartment 1003 has a length L3 (e.g., corresponding to about the length indicated by the bracket). As illustrated, trench 1010 has a length of about L1+L2 (e.g., items having a length up to L1+L2 can be stored in trench 1010 without overhanging vehicle 1000).

Vehicle 1020 includes trench 1030 extending from rear compartment 1023 through occupant compartment 1022, but not to front compartment 1021. For example, items may be loaded into trench 1030 from the rear of vehicle 1020 by opening panel 1029 (e.g., a trunk, hatch, bumper panel, or tailgate, or combination thereof depending on the vehicle type) and passing the items through a rear bulkhead of the vehicle. As illustrated, trench 1030 extends from rear compartment 1023 beneath a first row of seats 1026 (e.g., beneath and/or between rear seats), and beneath a second row of seats 1025 (e.g., beneath and/or between front seats). As illustrated, trench 1030 extends to, and at least partially beneath dash console 1027. As illustrated, front compartment 1021 has a length L1 (e.g., corresponding to about the length indicated by the bracket), occupant compartment 1022 has a length L2 (e.g., corresponding to about the length indicated by the bracket), and rear compartment 1023 has a length L3 (e.g., corresponding to about the length indicated by the bracket). As illustrated, trench 1030 has a length of about L2+L3 (e.g., items having a length up to L2+L3 can be stored in trench 1030 without overhanging vehicle 1020).

Vehicle 1040 includes trench 1050 extending from front compartment 1041 through occupant compartment 1042, and through to rear compartment 1043. For example, items may be loaded into trench 1040 from the front of vehicle 1040 by opening panel 1048 (e.g., a hood) and passing the items through a bulkhead in the firewall of the vehicle, or from panel 1049 (e.g., arranged at a rear of vehicle 1040) by opening panel 1049 (e.g., a trunk, hatch, tailgate, bumper panel, or combination thereof) and passing the items through a rear bulkhead of the vehicle. Any of the illustrative trenches, inserts, or other features of the present disclosure may be applied to any of vehicles 1000, 1020, and 1040 of FIG. 10. As illustrated, trench 1050 extends from front compartment 1041 beneath dash console 10047 (e.g., which may include a steering wheel, vent air grates and controls, a touchscreen, and user-controlled buttons or knobs), beneath a first row of seats 1045 (e.g., beneath and/or between front seats), beneath a second row of seats 1046 (e.g., beneath and/or between rear seats), and through rear storage compartment 1043. Accordingly, trench 1050 is accessible from front compartment 1041, occupant compartment 1042, and rear compartment 1043. In some embodiments, for example, trench 1050 extends unobstructed from occupant compartment 1042 of vehicle 1040 to each of storage compartments 1041 and 1043 of vehicle 1040 (e.g., to accommodate long items). For example, items that are longer than any front compartment 1041, occupant compartment 1042, and rear compartment 1043 may be stored via trench 1050. As illustrated, front compartment 1041 has a length L1 (e.g., corresponding to about the length indicated by the bracket), occupant compartment 1042 has a length L2 (e.g., corresponding to about the length indicated by the bracket), and rear compartment 1043 has a length L3 (e.g., corresponding to about the length indicated by the bracket). As illustrated, trench 1050 has a length of about L1+L2+L3 (e.g., items having a length up to L1+L2+L3 can be stored in trench 1050 without overhanging vehicle 1040).

In an illustrative example of vehicles such as those of FIG. 10, in some embodiments, a trench extends into and beneath a center counsel (e.g., a dash console), where the center console extends from a front bulkhead (e.g., the boundary between the front storage compartment to the occupant compartment) to approximately the back of a front row of seats (e.g., a trench shorter than trench 1010 that ends at the back of row of seats 1005). In some embodiments, the bottom of the center console may be raised to provide sufficient height above the bottom of the trench for storing objects (e.g., the center console may at least partially define the height of the trench. The trench and objects contained therein may be, but need not be, accessible within the occupant compartment. In some embodiments, a trench can extend under one or more rear seats (e.g., a row of rear seats) and the rear seat may also include a bottom that is raised over the trench defining the height of the trench. For example, trench 1030 may extend beneath row of seats 1026, which may define the height of trench 1030 in at least some of occupant compartment 1022. In some embodiments, vehicles 1000, 1020, and 1040 of FIG. 10 may include one or more rows of seats, each of which may include one or more seats, a bench seat, or a center console. In an illustrative example, the vehicle may include a compartment (e.g., front compartments 1001, 1021, or 1041, or rear compartments 1003, 1023, or 1043) that is accessible from an exterior of the vehicle separate from the occupant compartment (e.g., occupant compartments 1002, 1022, or 1042). The vehicle may include one or more exterior panels (e.g., hood 520, panel 1008, 1029, 1048, or 1049) configured to provide access to a trench (e.g., trench 1010, 1030, or 1050) and to restrict access to the trench. For example, the occupant compartment (e.g., occupant compartments 1002 or 1042) may include a second row of seats arranged adjacent the first row (e.g., a front row and a rear row of seats), and the trench (e.g., trench 1010 or 1050) extends from the compartment (e.g., front compartment 1001 or 1041) past the first row of seats (e.g., front seats) to the second row of seats (e.g., rear seats). In a further example, the occupant compartment (e.g., occupant compartments 1022 or 1042) may include a second row of seats arranged adjacent the first row (e.g., a rear row and a front row of seats), and the trench (e.g., trench 1030 or 1050) extends from the compartment (e.g., rear compartment 1023 or 1043) past the first row of seats (e.g., rear seats) to the second row of seats (e.g., front seats). In a further example, the compartment has a first length (L1 or L3, depending on the configuration), the occupant compartment (e.g., occupant compartments 1002, 1022, or 1042) has a second length (L2), and the trench (e.g., trench 1010, 1030, or 1050) extends the first length plus the second length (e.g., extends L1+L2, or L3+L2, at least). In a further example, the compartment may be a front compartment (e.g., front compartments 1001 or 1041) arranged forward of an occupant compartment (e.g., occupant compartments 1002 of 1042), and a front panel (e.g., panel 1008 or 1048) covers or provides access to the trench (e.g., trench 1010 or 1050). In a further example, the compartment may be a rear compartment (e.g., rear compartments 1023 or 1043) arranged rearward of an occupant compartment (e.g., occupant compartments 1022 of 1042), and a rear panel (e.g., panel 1029 or 1049) covers or provides access to the trench (e.g., trench 1030 or 1050).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A storage trench of a vehicle, the storage trench comprising:
    a bottom surface recessed relative to a floor of an occupant compartment of the vehicle;
    a first side surface extending upwards from the bottom surface to the floor on a first side of the trench; and
    a second side surface extending upwards from the bottom surface to the floor on a second side of the trench, wherein:
        the trench extends unobstructed from the occupant compartment of the vehicle to a storage compartment of the vehicle, wherein the storage compartment of the vehicle is longitudinally in front of the occupant compartment.

2. The storage trench of claim 1, wherein the trench comprises a length that is greater than a first length of the storage compartment.

3. The storage trench of claim 1, further comprising an insert configured to be arranged along the trench, wherein a bottom portion of the insert is recessed below the floor of the occupant compartment when installed.

4. The storage trench of claim 3, wherein the insert is configured to be removable from the trench by accessing the insert from the storage compartment.

5. The storage trench of claim 3, further comprising one or more rails, wherein the insert is configured to translate along the one or more rails.

6. The storage trench of claim 3, further comprising one or more features, wherein the insert comprises one or more mating features that form a sliding interface with the one or more features.

7. A vehicle comprising:
an occupant compartment comprising:
- a first seat and a second seat arranged in a first row, and
- a floor arranged at a bottom side of the occupant compartment;

a compartment arranged longitudinally in front of the occupant compartment; and a trench extending from the compartment to the occupant compartment between the first seat and the second seat, wherein the trench comprises:
- an upward facing surface providing an interface to the occupant compartment, wherein the upward facing surface is recessed in the floor of the occupant compartment.

8. The vehicle of claim 7, wherein the occupant compartment comprises:
- a dash console arranged at a front side of the occupant compartment;
- a first floor section of the floor arranged beneath the first seat; and
- a second floor section of the floor arranged beneath the second seat, wherein the trench extends between the first floor section and the second floor section through the dash console.

9. The vehicle of claim 7, wherein:
- the floor comprises a first material; and
- the trench comprises a second material different from the floor material.

10. The vehicle of claim 7, wherein the compartment is accessible from an exterior of the vehicle separate from the occupant compartment, and wherein the vehicle further comprises a panel configured to provide the accessibility to the trench and to restrict access to the trench.

11. The vehicle of claim 10, wherein the occupant compartment further comprises a second row of seats arranged adjacent the first row, and wherein the trench extends from the compartment past the first row of seats to the second row of seats.

12. The vehicle of claim 10, wherein the compartment comprises a first length, wherein the occupant compartment comprises a second length, and wherein the trench extends the first length plus the second length.

13. The vehicle of claim 10, wherein the compartment comprises a rear compartment arranged behind the occupant compartment, and wherein the panel comprises a rear panel.

14. The vehicle of claim 7, further comprising a cover arranged to cover the trench, wherein the cover is joined to a side surface of the trench at a hinge.

15. The vehicle of claim 7, further comprising a tie-down arranged to at least partially cover the trench and configured to secure items in the trench, wherein the tie down is joined to a side surface of the trench at a mount.

16. The vehicle of claim 7, wherein the trench comprises:
- a bottom surface recessed relative to the floor;
- a first side surface extending upwards from the bottom surface to the floor on a first side of the trench; and
- a second side surface extending upwards from the bottom surface to the floor on a second side of the trench.

17. The vehicle of claim 7, further comprising an insert configured to be arranged along the trench, wherein a bottom portion of the insert is recessed below the floor of the occupant compartment when installed.

18. The vehicle of claim 17, wherein the insert is configured to be removable from the trench by accessing the insert from the compartment.

* * * * *